United States Patent [19]

Kahn

[11] Patent Number: 5,625,893
[45] Date of Patent: Apr. 29, 1997

[54] SATELLITE COMMUNICATIONS SYSTEM WITH RECEIVER DISTORTION CORRECTION WHICH IS CONTROLLED BY UP-LINK TRANSMISSION EQUIPMENT

[76] Inventor: Leonard R. Kahn, 137 E. 36th St., New York, N.Y. 10016

[21] Appl. No.: 98,560

[22] Filed: Jul. 26, 1993

[51] Int. Cl.$^6$ .................................................. H04B 7/00
[52] U.S. Cl. .......................... 455/70; 455/12.1; 455/116; 455/126; 375/296
[58] Field of Search .............................. 455/45, 116, 126, 455/127, 13.4, 70, 12.1, 63; 375/58, 60, 296, 297

[56] References Cited

U.S. PATENT DOCUMENTS

| | | | |
|---|---|---|---|
| 2,666,133 | 1/1954 | Kahn | 455/109 |
| 3,440,539 | 4/1969 | Hamming | 455/70 |
| 3,679,983 | 7/1972 | Theriot | 375/99 |
| 3,974,447 | 8/1976 | Löfmark | 455/70 |
| 4,194,154 | 3/1980 | Kahn | 455/114 |
| 5,119,040 | 6/1992 | Long et al. | 455/126 |

*Primary Examiner*—Reinhard J. Eisenzopf
*Assistant Examiner*—Doris To

[57] ABSTRACT

A satellite communications system with improved intermodulation distortion characteristics as the result of incorporating distortion reduction circuitry in the down-link receiver but which is controlled by the up-link transmission equipment.

2 Claims, 4 Drawing Sheets

SATELLITE COMMUNICATIONS SYSTEM WITH RECEIVER DISTORTION CORRECTION WHICH IS CONTROLLED BY UP-LINK TRANSMISSION EQUIPMENT

FIELD OF THE INVENTION

The instant invention is applicable to satellite communications with ground-to-ground terminals, satellite-to-satellite communications systems and to terrestrial systems where unattended repeaters are used including submerged cable systems.

BACKGROUND OF THE INVENTION

All linear amplifiers have a finite overload limit. In satellite communications systems this restriction is of great importance because of the limited power available on the satellite and size and weight limitations of the satellite equipment.

FIG. 1 is a curve of a typical linear amplifier used in satellite transponders. Many transponders use travelling wave tube amplifiers (TWTA) and much work has been done to replace such amplifiers with solid state power amplifiers (SSPA) because of their greater linearity and also higher reliability. But even the best of linear amplifiers create distortion and the transponder's linear power amplifier is the weakest link in the overall satellite communications system. Such amplifiers produce intermodulation distortion that causes a noise like product when a large number of signals are frequency multiplexed. For an excellent discussion of the envelope and phase linearities satellite systems see J. J. Spilker, Jr., "Digital Communications by Satellite", Prentice-Hall, 1977, Englewood Cliffs, N.J., especially Chapter 9.

(This problem can be somewhat alleviated by the use of the envelope elimination and restoration (EER) system as disclosed in applicant's patents, for example U.S. Pat. No. 2,666,133 and described in a number of papers, for example L. R. Kahn, "Comparison of Linear Single-Sideband Transmitters with Envelope Elimination and Restoration Single-Sideband Transmitters", Pro. IRE, December 1956, page 1706–1712. But, of course, even the EER system is not distortion free.)

The instant invention is described in terms an overall system for delivering a large number (300) of high fidelity stereo channels utilizing only 18 mHz of a C-Band satellite system. Applicant's co-pending application Ser. No. 08/088,123 filed on Jul. 8, 1993 discloses such a system including a novel encryption system and that application is incorporated by reference herein.

However, the invention may be applied to all types of modulation and to various forms of information transmitted over the satellite channels and is not limited to ground-to-ground satellite systems but also can be used to increase the range and performance of satellite-to-satellite communications systems and to terrestrial systems where unattended repeaters such as used with submerged cable systems.

For a better understanding of the present invention, together with other and further objects, reference is made to the following description, taken in conjunction with accompanying drawings, and its scope will be pointed out in the appended claims.

SUMMARY OF THE INVENTION

In one embodiment of the invention a 70 mHz intermediate frequency wave carrying 300 channels of high fidelity stereo is produced and fed to a C-Band up-link transmitter. A sample of the multiplex wave is fed to an amplifier which simulates the transponder's power amplifier aboard the satellite. From the simulated amplifier correction signal information is generated and said information is then fed to through the satellite to the ground receivers. Said correction information is then used in the receiver to cancel or substantially reduce the transponder's distortion.

Of course the generation of the correction signal can be performed mathematically rather than by use of a simulated amplifier in accordance with this invention.

The instant invention improves satellite communications systems by correcting for transponder amplifiers subject to overload or operation beyond their linear regions causing intermodulation distortion by introducing the following steps:

a) generating a signal that is of the correct shape for compensating for the non-linearity of said linear amplifiers, b) sending that wave shape via the up-link transmitter to one or more down-link receivers, c) using the correction wave to vary the gain of one or more IF amplifier(s) of said receiver(s) so as to cancel or substantially reduce the intermodulation distortion generated by linear amplifiers aboard the satellite. The satellite communications systems described and claimed herein include distortion correction for both envelope distortion and correction of incidental phase modulation.

DESCRIPTION OF THE INVENTION

Figure 1:
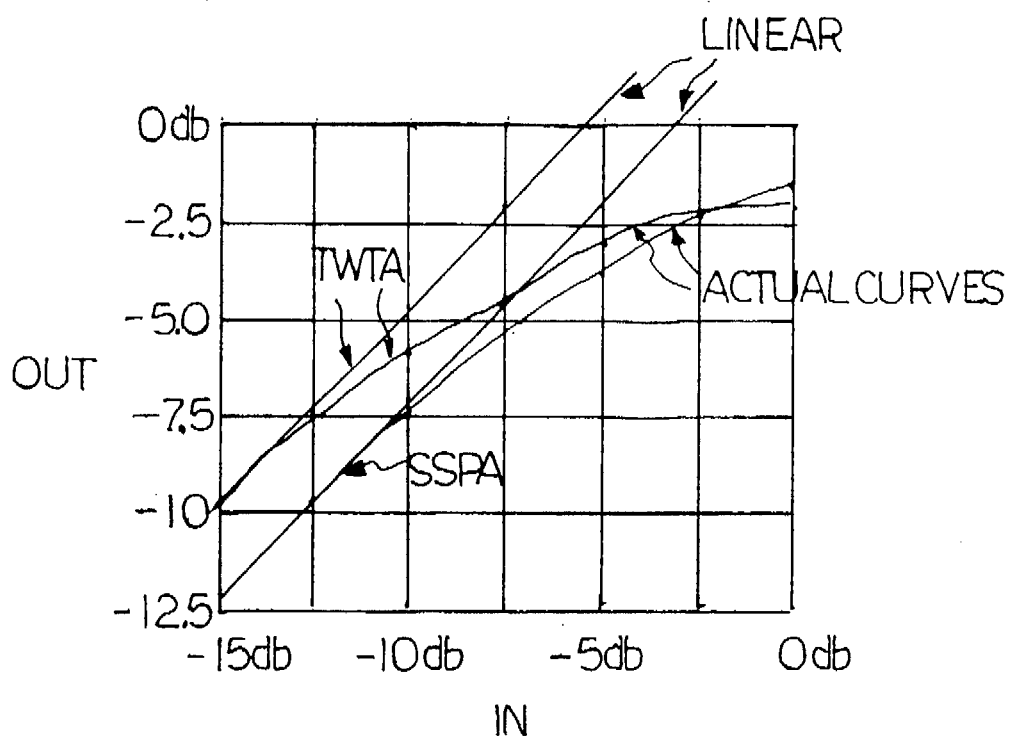
FIG. 1 is a sketch of the transfer characteristic of a transponder, data from Jonnalagadda & Schiff: "Improvements in Capacity of Analog Multiplex Systems", Pro. IEEE. November 1984, see page 1545 as well as its cited references.
Figure 2:
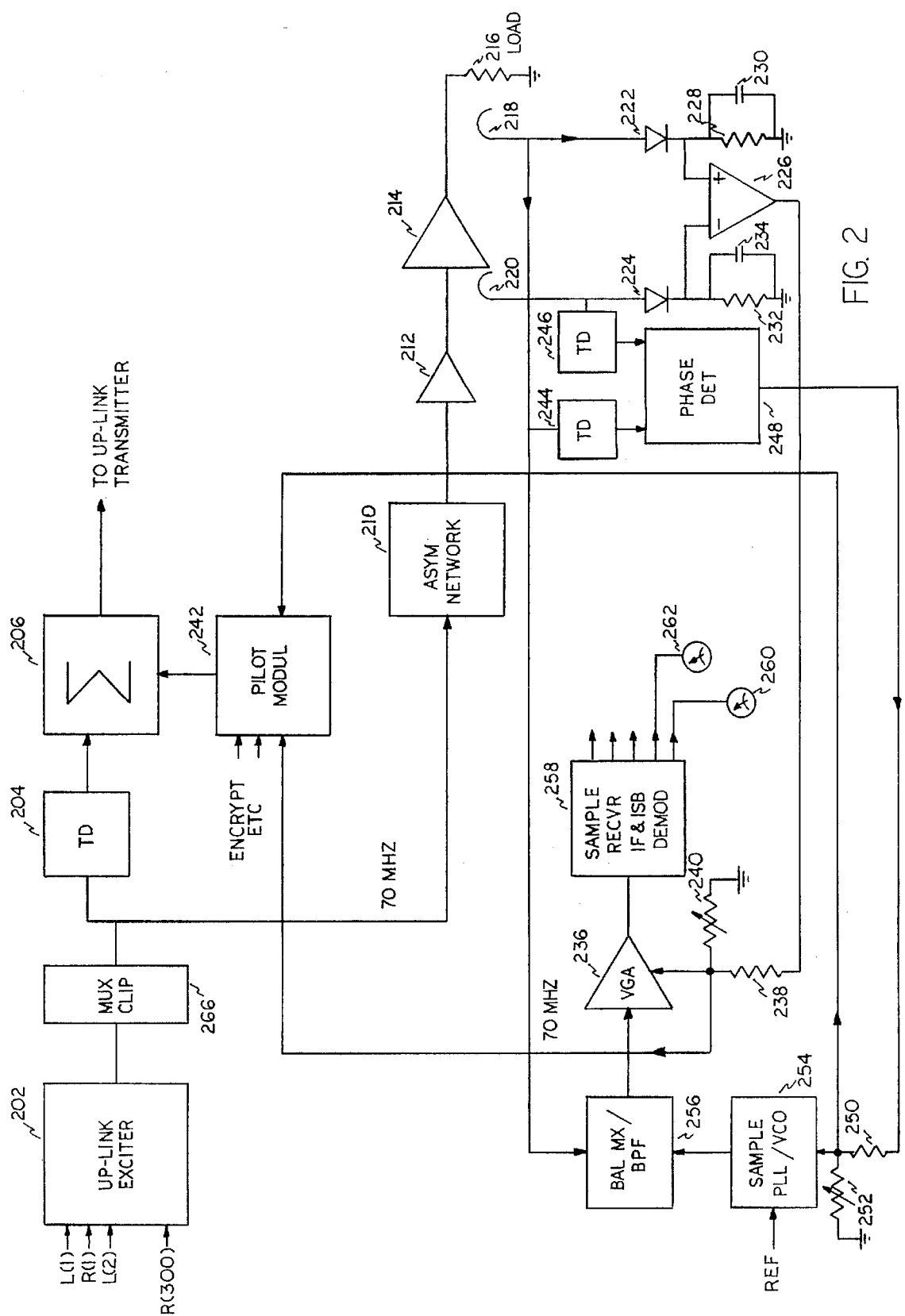
FIG. 2 is a block diagram of up-link equipment incorporating circuitry for generating distortion correction information.

FIG. 2 shows in block form one embodiment of the up-link part of the invention. Up-link exciter 202 inputs in this example 300 L and R stereo audio channels. The exciter processes these stereo signals producing for one application encrypted high fidelity stereo signals utilizing single-sideband suppressed carrier (SSBSC) modulation. As pointed out above, the invention can also be used to transmit other types of signals such as digital data and narrowband telephone signals and can also use various forms of modulation.

The output of the up-link exciter is, for example, a 70 mHz IF wave having, for example, an 18 mHz bandwidth. The IF wave is passed through a time delay circuit TD 204. This delay circuit provides time for the distortion correction signal to become active in the down-link receiver, in the order of 5 to 10 microseconds. Note that no allowance for the transmission time for the rf signal to go up and come down from the satellite is required as the entire signal, including the correction control signal, is subject to substantially the same transit time delay.

TD 204 then feeds summation circuit 206 which in turn feeds the up-link transmitter.

A sample of the 70 mHz IF from exciter 202 feeds asymmetrical network 210. This network simulates the effect of the RF networks that the multiplex signal passes through once it is generated in the up-link transmission equipment and as it passes through the satellite and as it is processed in a down-link receiver prior to being demultiplexed in the predemodulation filters of block 308 of FIG. 3 described below.

Some of the bandpass filters in said path are asymmetrical and therefore to properly simulate their effects, block 210 of FIG. 2 is asymmetrical. For a discussion of asymmetrical networks and their effect, please see applicant's U.S. Pat. No. 4,194,154 treating asymmetrical antennas. The effect of block 210 is to alter the waveshape of both the envelope and phase modulation correction waveshapes.

It should be noted that instead of detecting envelope modulation and PM correction waveshapes it may, in certain embodiments of this invention, use in-phase detectors (I detectors) and quadrature detectors (Q detectors). Both the I/Q and AM/PM methods of analysis provide complete solutions to such systems as treated in this disclosure.

The output of asymmetrical network 210 feeds amplifier 212 which raises the power level to a point that it provides normal drive for power amplifier 214.

Amplifier 214 is a low powered amplifier that simulates the amplifier used in the satellite transponder which creates the distortion circuit. Details of one such amplifier is provided in the description of FIG. 4. (While probably the best simulation would be to use a copy of the amplifier in the satellite at for C Band operation in the 4 gigahertz band, that embodiment of the invention is much more expensive to manufacture.) Resistor 216 loads the amplifier.

Samples of the output and input waves of amplifier 214 are taken by RF probes 220 and 218. These samples allow comparison of the output and the input of amplifier so as to determine the envelope distortion component and also the incidental phase modulation component.

First we will consider the envelope distortion factor (AM/AM) by detecting the output envelope using detector 222 and its RC load 228 and 230 and feeding it to the non-inverting port of differential amplifier 226. Similarly, we can use the input sample from probe 220 and using envelope detectors 224, 232 and 234 to feed the inverting difference port of subtraction circuit (operational amplifier) 226.

The output of 226 produce a difference voltage that is used in an open loop to control variable gain amplifier VGA 236 to substantially remove or greatly reduce the amplitude nonlinearity in the down-link receivers.

Attenuator 238/240 controls the level of correction signal to VGA 236 changing the envelope of the 70 mHz IF in the sample receiver. The effectiveness of the circuit can be determined by how low the readings of meters 260 and 262 are. These meters monitor the audio output level of two or more idle SSB channels. They can also be used to monitor the combined levels of all idle channels. The frequency of the idle channels should be selected so they are most critical to adjustment and represent the best overall adjustment.

The incidental phase modulation of the satellite transponder is reduced by feeding the rf samples from probes 218 and 220 to phase detector 248. These samples are delayed by time delay circuits TD 244 and 246. The delay circuits are identical and should provide the correct amount of delay to equalize the time of arrival of the phase modulation with the slower envelope modulation correction.

The output of phase detector 248 feeds attenuator 250/252 which adjusts the amount of phase modulation in the sample PLL/VCO circuit 254 to cancel or neutralize the PM of the satellite's down-link linear amplifier.

Thus, the output of the up-link equipment generates the information required to substantially reduce distortion in the down-link receivers. It is now necessary to transmit this information to the down-link receivers. This is accomplished by feeding the control signals from attenuators 238/240 and 250/252 to pilot modulator 242.

In a preferred embodiment of the invention a 61.6 mHz modulated carrier provides means to transmit the correction information to down-link receivers. The information can be sent, for example, by using the upper-sideband for the envelope correction and the lower-sideband for phase modulation signal. The carrier should be suppressed for best performance. Of course, other systems of modulation may be used to transmit the two control waves such as in-phase and quadrature modulation of a 61.6 mHz carrier. However, if signals having carriers or substantial sidebands are used, they must be considered in the distortion correction signal. The information may also be included in the digital stream if digital rather than analog modulation is used.

The pilot signal from pilot modulator 242 is fed to summation circuit 206 which in turn feeds the up-link transmitter.

Figure 3:
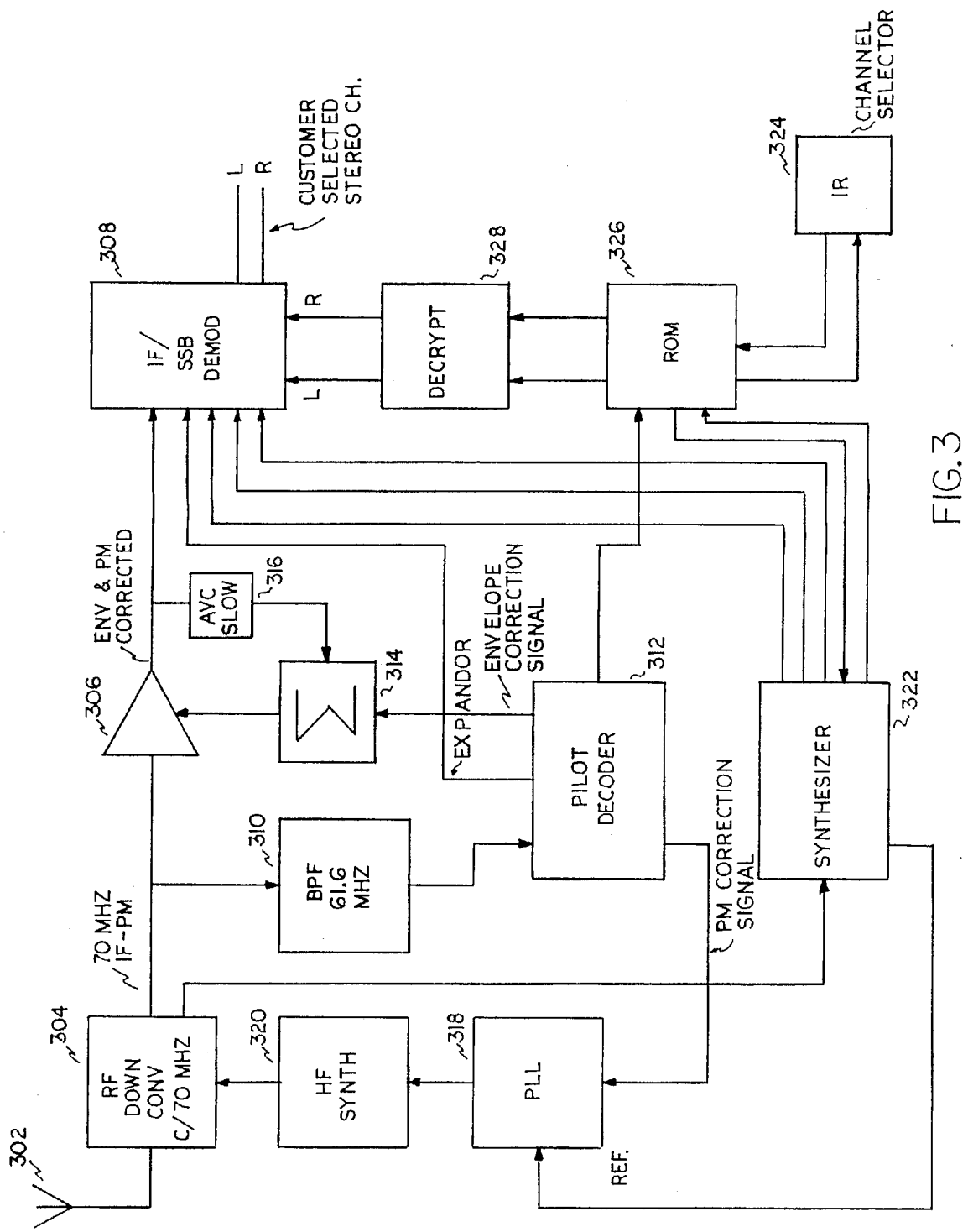
FIG. 3 is a block diagram of a down-link receiver incorporating circuitry for using the distortion correction information to cancel or at least to substantially reduce distortion.

Referring to FIG. 3, which is a block diagram of the down-link receiver of one embodiment of the instant invention. Antenna 302 is normally a dish pointed at the satellite incorporating the linear amplifier being corrected.

RF down converter 304 converts the C-Band signals to 70 mHz, for example. The output of down converter 304 feeds variable gain amplifier 306 which is used to provide the envelope modulation correction and is of the same design of the sample receiver's VGA, block 236 of FIG. 2.

The output of VGA 306 feeds IF/SSB demodulator 308. This block contains circuitry for amplifying and SSB the amplified SSB wave and, in one embodiment, includes circuitry for decoding/decrypting the stereo channels. Such circuitry is described in the referenced co-pending application, Ser. No. 08/088,123.

In one embodiment of the invention the user can select a single stereo channel which is processed in block 308 and the resulting output appears on output lines L and R of block 308.

The pilot carrying the control signals to compensate for the envelope distortion and incidental phase modulation of the down-link linear amplifier is selected from the 70 mHz IF wave by bandpass filter 310. Filter 310, for example, would be centered at 61.6 mHz and its output would feed pilot decoder 312. The pilot decoder contains, for one preferred embodiment of the invention, an ISB demodulator that isolates the envelope control voltage (upper-sideband) and feeds that signal through summation circuit 314 to VGA 306 thus substantially removing the envelope distortion.

Variable gain amplifier 306 can also be used to provide correction for slow changes in signal level by use of AVC detector 316. However, in order to avoid any loss of the correction effect, the speed of ArC circuit must be slow. This is not normally a problem as gain changes in many applications of this invention are very slow. If faster correction is necessary a separate VGA with AVC detector should be designed for operation ahead of VGA 306.

The lower sideband of the 61.6 mHz pilot signal carries the incidental phase modulation correction signal and that output of pilot decoder 312 feed phase lock loop PLL 318. The phase lock loop output is phase modulated and feeds high frequency synthesizer 320 which produce the correct output to produce the 70 mHz IF output from down converter 304 and also causes the incidental phase modulation from the satellite linear power amplifier to be substantially cancelled.

FIG. 3 also incorporates description circuitry as described in more fully referenced co-pending patent Ser. No. 08/088,123. Thus, synthesizer 322 produces the necessary mixing frequencies used in ISB/SSB demodulator 308 in accordance with the channel selected by the subscriber as detected in the infrared circuit 324. ROM 326 provides support for the synthesizer operation as well as the decrypt circuit 328.

In addition to the advantages discussed in the above description of FIG. 2 and FIG. 3 a further increase in signal-to-noise and signal-to-intermodulation distortion and interference can be achieved by incorporating a special multi-channel clipper (MUX clip) block 266 of FIG. 2 that reduces the crest factor of the 300 channel MUX ISB stereo channels. This slipper can also be used with of other forms of modulation reduce their crest factors.

By purposely introducing this "non-linear (clipper)" the effective signal strength is raised but, of course, this would normally be unacceptable as the intermodulation distortion components would increase more rapidly than would the signal strength. However, this non-linearity is also eliminated in the receiver by providing the inverse effective modulation to straighten out the overall transfer characteristic of the equipment. In effect, it expands the dynamic range of the clipped signal reducing the intermodulation back to approximately where it would be absent the use of the special multi-channel clipper in the up-link transmitter.

Figure 4:
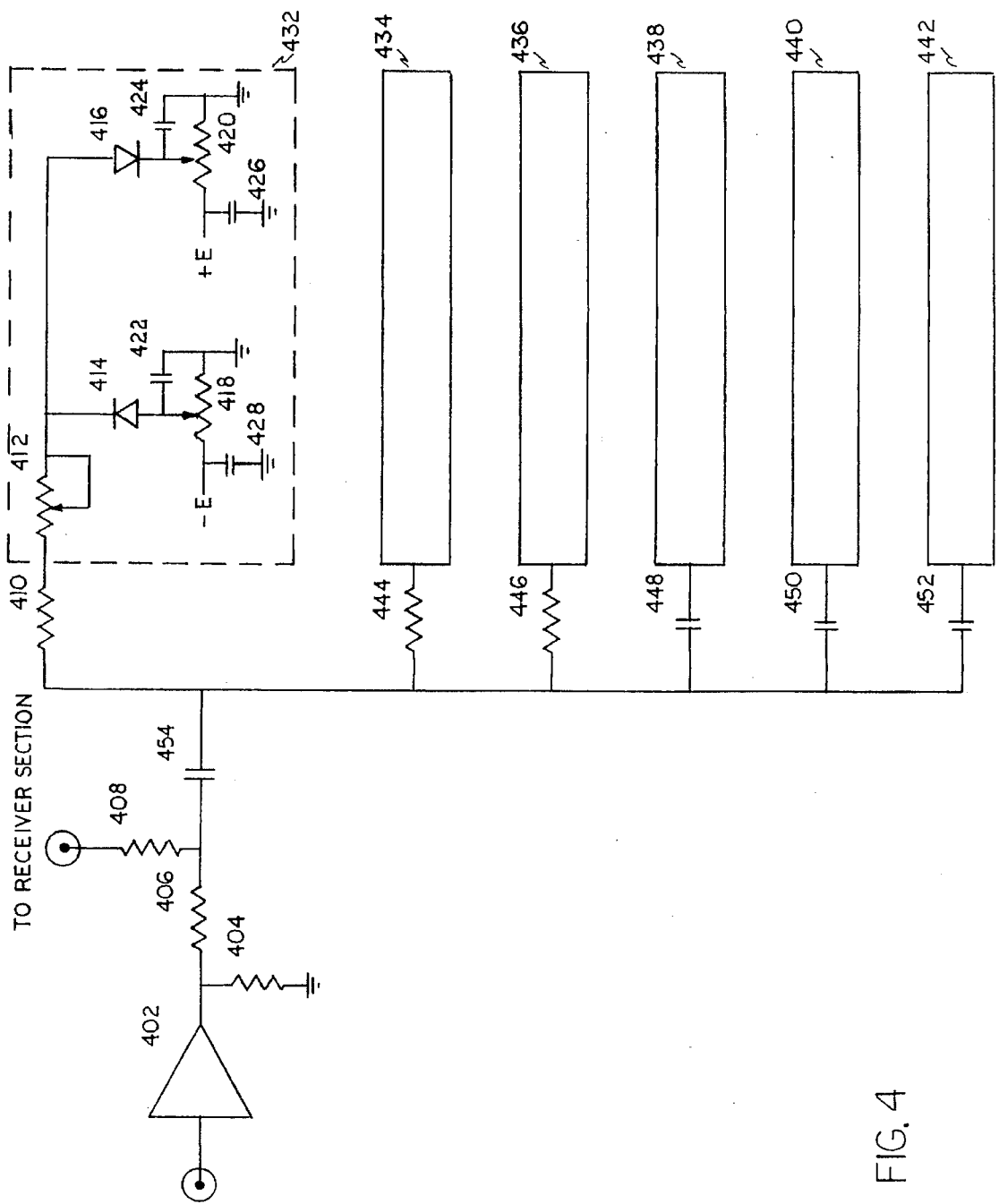
FIG. 4 is a simplified circuitry for simulating the transponder's amplifier that may be used to generate the distortion correction information.

FIG. 4 shows another means for simulating the satellite's linear power amplifier when it operates in to its non-linear region. Amplifier 802 produces a few milliwatt wave at, for example, 70 mHz. Load 404 provides a termination for the amplifier. A suitable solid state device for such an amplifier is a wideband operational amplifier OPA603.

Resistor 406 typically would have a value equal to five times the value of 404. For example, if 404 is 150 ohms 406 would be 750 ohms. A 5,000 resistor 408 feeds the input of the simulated receiver section. Capacitor 454 blocks any dc voltage at the output of amplifier 402.

Resistor 406 feeds in turn resistor 410. This resistor will load the output of resistor 406 whenever the power output of the amplifier exceeds a specific level causing the output at the output of 406 to droop. Resistor 410, for example, would be in the order of 2,000 ohms.

Similarly, resistors 444 and 446 will load resistor 406 at different levels, for example, resistor 444 would be a 1,000 ohm resistor that would load the higher overload conditions and resistor 446 would be a 500 ohm resistor producing substantial loading for higher overload conditions.

Details of the nonlinear loading is shown in dotted box 432. Variable resistor 412 is adjusted for shaping the abruptness of the clipping. The larger this resistor value is adjusted the less loading factor is presented. Thus, variable resistor 412 operates in conjunction with 410 and acts as a veneer. If resistor 410 was not provided the user adjusting this circuit could inadvertently put in a very sharp clamp which would not properly approximate the nonlinear characteristic desired.

Diodes 414 and 416 provide the actual ±clipping and the clip points are set by ganged potentiometers 418 and 420. A suitable value for ganged potentiometers 418 and 420 is 500 ohms. These potentiometers are mechanically ganged so as to provide symmetrical positive clipping by diode 416 and negative RF clipping by diode 414.

Bias voltages are fed to 418 (−E) and potentiometer 420 (+E). A suitable bias voltage for E is 15 volts. The arms of both potentiometers are bypassed for RF by capacitor 422 and capacitor 424. Also, to avoid RF passing through the power supply +E voltage is bypassed to ground by capacitor 426 and the −E voltage is bypassed by capacitor 428.

This entire circuit is identified by the dotted box 432. Resistor 444 operates with circuit 434 which is the same as 432. However, resistor 444 has a lower resistance and the clip level of 434 is set to a higher point and the setting of its equivalent of variable resistor 412 is set for the desired nonlinearity. Resistor 446 has a smaller value than resistors 444 and 446 and it is set for the highest clip level.

Capacitors 448, 450 and 452 in conjunction with clippers 438, 440 and 442 provide the simulation of the incidental phase modulation IPM (AM/PM) component of the linear amplifier. Blocks 438, 440 and 442 are set to create in various amounts of phase shift so as to simulate the IPM component.

The above described embodiments of the invention apply to a service where a large number of receivers are being serviced by a single up-link transmitter. Accordingly, it is essential that the design of the equipment is such that the transmission equipment includes as much of the system's circuitry as possible. Thus, if there is a choice as to where processing equipment is located, it should be incorporated in the up-link transmitter plant.

However, when the instant invention is applied to point-to-point systems or other situations where only a small number of receivers are in the system, the cost and complexity of the receivers generally is not a major consideration. Thus, when the invention is used where a single up-link transmitter services many receivers delay circuits 204, 246 and 244 are part of the transmission plant.

Receiver simplicity and cost is another reason for using single sideband modulation and independent sideband suppressed carrier modulation to transmit the distortion correction information. If, however, digital data is transmitted over a single transducer using a number of separate carriers for multiple access to different receiver locations, it would be advantageous to transmit the distortion cancellation information as part of the digital streams of the separate carriers.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

I claim:

1. A satellite communications system for transmitting hybrid modulated waves consisting of amplitude, envelope, modulation and phase, angular, modulation components, and wherein linear r.f. power amplifiers are located aboard a satellite, said amplifiers being permitted to operate beyond their linear amplitude operating range, thus creating distortion, comprising the following devices arranged to substantially reduce the created distortion:

a generator for producing a hybrid modulated wave fed by one or more sources of intelligence, the output of said generator being connected to a nonlinear circuit that limits, flattens, the envelope modulation component of the hybrid modulated wave, circuitry for detecting the difference between the flattened wave output of the nonlinear circuit and its input, uplink transmission equipment, that transmits both the hybrid modulated wave and the output of the difference detection circuitry to a communications satellite incorporating the linear rf power amplifiers which are operated beyond their linear ranges, and which transmit the signals received by the satellite to the ground or other satellite based receivers, one or more receivers that receive signals from the satellite where said linear amplifiers are located, the receivers including circuitry for using the signal representing the output of the difference detection circuit to restore the flattened hybrid modulated wave to substantially its original unflattened condition thereby substantially reducing distortion.

2. The satellite system of claim 1 wherein the transmission system for transmitting the difference detected signal has a substantially smaller bandwidth than the bandwidth for transmitting the flattened hybrid modulated wave.

* * * * *